US012786715B2

(12) United States Patent
Al Accad et al.

(10) Patent No.: US 12,786,715 B2
(45) Date of Patent: Nov. 3, 2026

(54) RADIO ACCESS NETWORK SECURE AUTHENTICATION

(71) Applicant: T-Mobile Innovations LLC, Overland Park, KS (US)

(72) Inventors: Ahmad Al Accad, Renton, WA (US); Michael Engan, Bellevue, WA (US); Pablo Medeiros Dominguez, Redmond, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 356 days.

(21) Appl. No.: 18/466,938

(22) Filed: Sep. 14, 2023

(65) Prior Publication Data

US 2025/0097708 A1 Mar. 20, 2025

(51) Int. Cl.
*H04W 12/63* (2021.01)
*H04W 12/104* (2021.01)

(52) U.S. Cl.
CPC ......... *H04W 12/104* (2021.01); *H04W 12/63* (2021.01)

(58) Field of Classification Search
CPC ...... H04W 12/63; H04W 48/04; H04W 12/64
See application file for complete search history.

(56) References Cited

U.S. PATENT DOCUMENTS 8,027,691 B2 * 9/2011 Bernas .................... H04L 67/04 455/418
9,628,994 B1 4/2017 Gunyel et al.
10,776,791 B2 9/2020 Ferguson et al.
10,791,461 B1 * 9/2020 Gailloux ............... H04W 12/06
2021/0058383 A1 * 2/2021 Colon ................... H04W 12/61
2022/0248233 A1 * 8/2022 Reeves ................. H04L 9/3231
2022/0385656 A1 * 12/2022 Gujarathi ............ H04L 63/0876

FOREIGN PATENT DOCUMENTS

EP 4319231 A1 * 2/2024 ............ H04W 12/06
WO WO-03075125 A2 * 9/2003 ............ H04L 41/12

* cited by examiner

*Primary Examiner* — Jinsong Hu
*Assistant Examiner* — Justin Barry
(74) *Attorney, Agent, or Firm* — Jones Burke, PLLC

(57) ABSTRACT

Systems and methods are provided approving or denying a request for user account authentication for a mobile network operator (MNO). The method includes receiving a location of a wireless user device associated with a request for user account authentication for an MNO. The location of the wireless user device for the request for user account authentication is compared with known locations of the wireless user device over time to determine whether to approve or deny the authentication request.

18 Claims, 6 Drawing Sheets

RADIO ACCESS NETWORK SECURE AUTHENTICATION

TECHNICAL BACKGROUND

A wireless network, such as a cellular network, can include an access node (e.g., wireless access node) serving multiple wireless user devices or user equipment (wireless user device) in a geographical area covered by a radio frequency transmission provided by the access node. Access nodes may deploy different carriers within the cellular network utilizing different types of radio access technologies (RATs). RATs can include, for example, 3G RATs (e.g., GSM, CDMA etc.), 4G RATs (e.g., WiMax, LTE, etc.), and 5G RATs (new radio (NR)).

Cellular fraud is the unauthorized use, tampering or manipulation of a wireless user device or service. Types of cellular fraud may include subscriber identification module (SIM) swapping, porting a phone number to a different mobile device (cloning) and subscriber fraud.

SIM swapping involves physically stealing a SIM card from a mobile phone for use on a different mobile phone. Theft of a SIM device also makes a mobile device user susceptible to personal data theft. Cloning occurs when with enough personal information, a bad actor is able to port a mobile phone number over to different mobile device controlled by the bad actor. Subscriber fraud occurs when a scammer signs up for cellular service with fraudulently obtained customer information or false identification.

BRIEF DESCRIPTION OF THE DRAWINGS

The present disclosure can be understood from the following detailed description, either alone or together with the accompanying drawings. The drawings are included to provide a further understanding of the present disclosure and are incorporated in and constitute a part of this specification. The drawings illustrate one or more examples of the present teachings and together with the description explain certain principles and operations. In the drawings.

OVERVIEW

Figure 1:
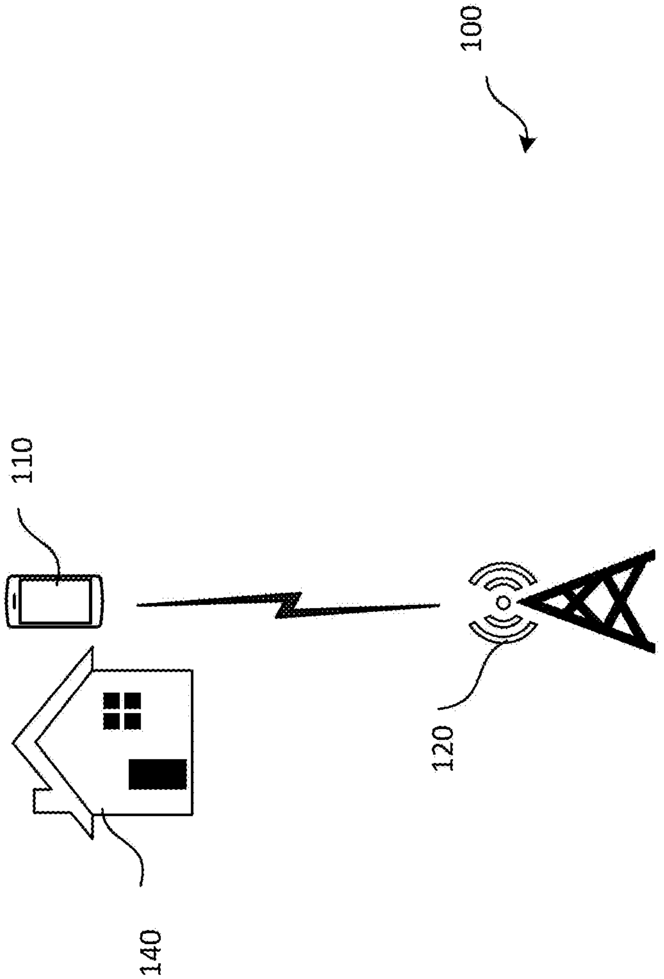
FIG. 1 depicts locations of a wireless user device in a wireless network, in accordance with disclosed examples.

Various aspects of the present disclosure relate to systems, methods, and computer readable media for co-existence of 5G signals and radar altimeters. In an example, In examples, systems, methods, and computer-readable media are provided for approving or denying a request for user account authentication for a mobile network operator (MNO). The method includes receiving a location of a wireless user device associated with a request for user account authentication for a mobile network operator (MNO). The location of the wireless user device for the request for user account authentication is compared with known locations of the wireless user device over time to determine whether to approve or deny the authentication request.

In one example, a system, method, and computer readable medium are provided for generating a response to a request for user account authentication for an MNO. A location of a wireless user device associated with a request for user account authentication for a mobile network operator (MNO) is received. The location of the wireless user device associated with the request for user account authentication is compared with a location profile of locations of the wireless user device over time to determine if the location of the wireless user device associated with the request for user account authentication satisfies a threshold associated with the location profile.

Responsive to satisfying the threshold associated with the location profile for the wireless user device, a response to the request for user account authentication is generated. The response to the request for user account authentication may approve, deny, or request additional authentication.

In examples, the locations are accessed from radio access network (RAN) data. The radio access network data may comprise a Cell ID and location area code (LAC) for each location of the wireless user device.

In examples, the location profile of the wireless user device is maintained by a core network of the MNO. In examples, the request for user account authentication originates at the wireless user device and is for one of subscriber identification module (SIM) swap, user account password reset or a user account wireless billing account transaction.

In yet another example, a method, system, and computer readable media are provided collecting radio access network data from a wireless user device and parsing the radio access network data into a Cell ID and a location area code (LAC). A location profile is populated for the wireless user device with a Cell ID and LAC for each location for the wireless user device over time.

DETAILED DESCRIPTION

In the following description, numerous details are set forth, such as flowcharts, schematics, and system configurations. It will be readily apparent to one skilled in the art that these specific details are merely exemplary and not intended to limit the scope of this application.

In addition to the particular systems and methods described herein, the operations described herein may be implemented as computer-readable instructions or methods, and a processor on the network for executing the instructions or methods. The processor may include an electronic processor.

Cellular fraud continues to rise. Bad actors and scammers use different methods to gain access to profiles and data of users and their phone numbers. Types of cellular fraud may include subscriber identification module (SIM) swapping, porting a phone number to a different mobile device (cloning) and subscriber fraud.

Criminals can obtain personal information and use it to set up a cell phone account in someone else's name. Mobile phone numbers can legally be ported from one provider to another provider when switching mobile network operators (MNO). Mobile numbers can also be ported from one mobile phone to another when upgrading or changing devices. But with enough of your personal information, scammers can port someone else's number to a device they possess.

When scammers initiate a porting request, they con the victim's carrier (MNO) into believing the request is from the authorized account holder. If the scam is successful, the phone number will be ported to a different mobile device controlled by the scammer.

Fraud detection is the process of using tools and procedures to prevent cellular fraud. Fraud detection is a security barrier to protect against various forms of fraud, such as SIM swapping, cloning and subscriber fraud. There are a variety of tools to help decide if a given request for a wireless user device is risky or should have elevated authentication applied when a given request has been determined to be risky.

In examples, an authentication engine uses of location of a wireless user device over time as a factor in deciding risk in a user account authentication request. After every successful attachment of a wireless user device to an access node, an authentication engine adds the location to a location profile for the wireless user device. Locations of wireless user device are monitored and tracked by the authentication engine.

The authentication engine uses the historical locations from the location profile for the wireless user device to determine the risk of new authentication requests. In one example, if the location originating an authentication request is not within the location profile for the wireless user device, the authentication engine can require additional authentication or deny the request. Additional authentication may be second factor or multi-factor authentication requiring a user to perform another factor of authentication such as entering an email or SMS pin immediately after entering their password. The authentication requests may be for high-risk transactions like a SIM swap request, and the historical location of the wireless user device is used as a factor for approving new authentication requests.

Turning now to the figures, various devices, systems, and methods in accordance with aspects of the present disclosure will be described.

Figure 2:
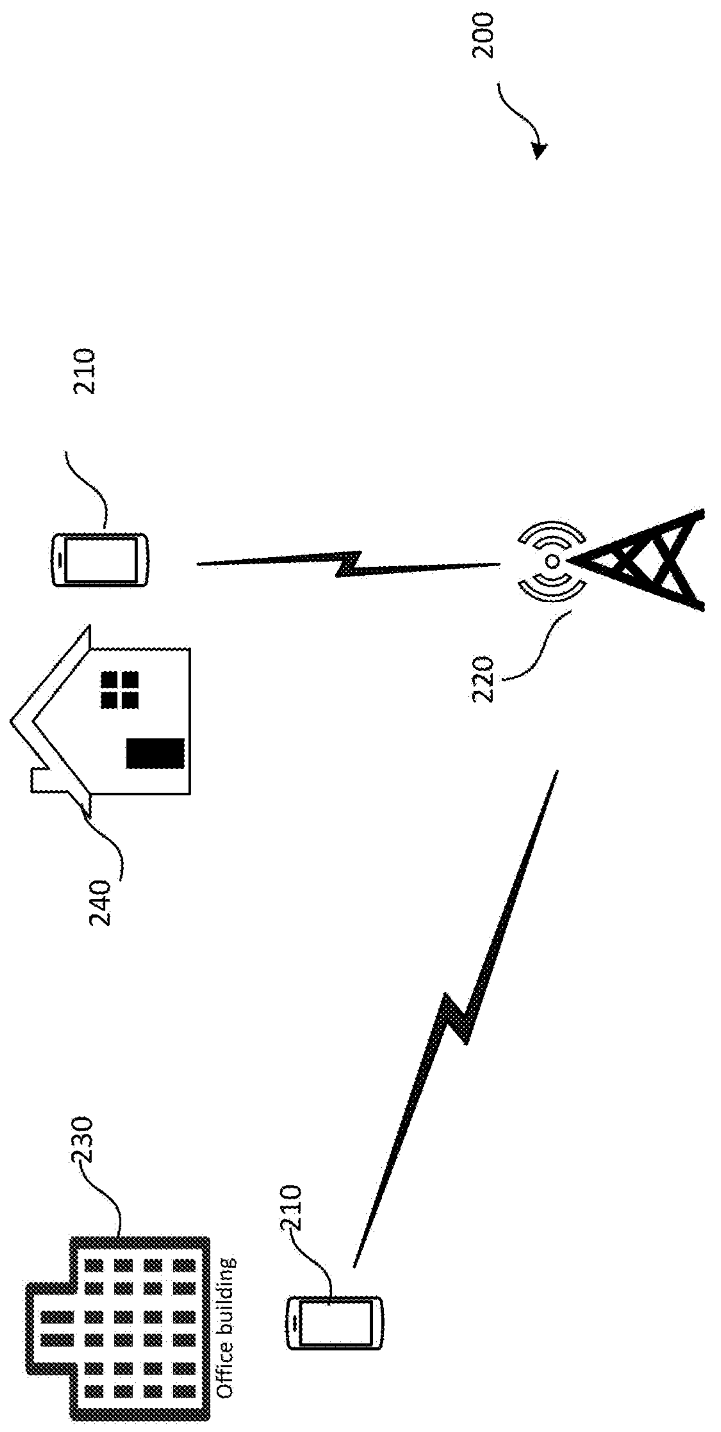
FIG. 2 depicts locations of a wireless user device in a wireless network, in accordance with another example.
Figure 3:
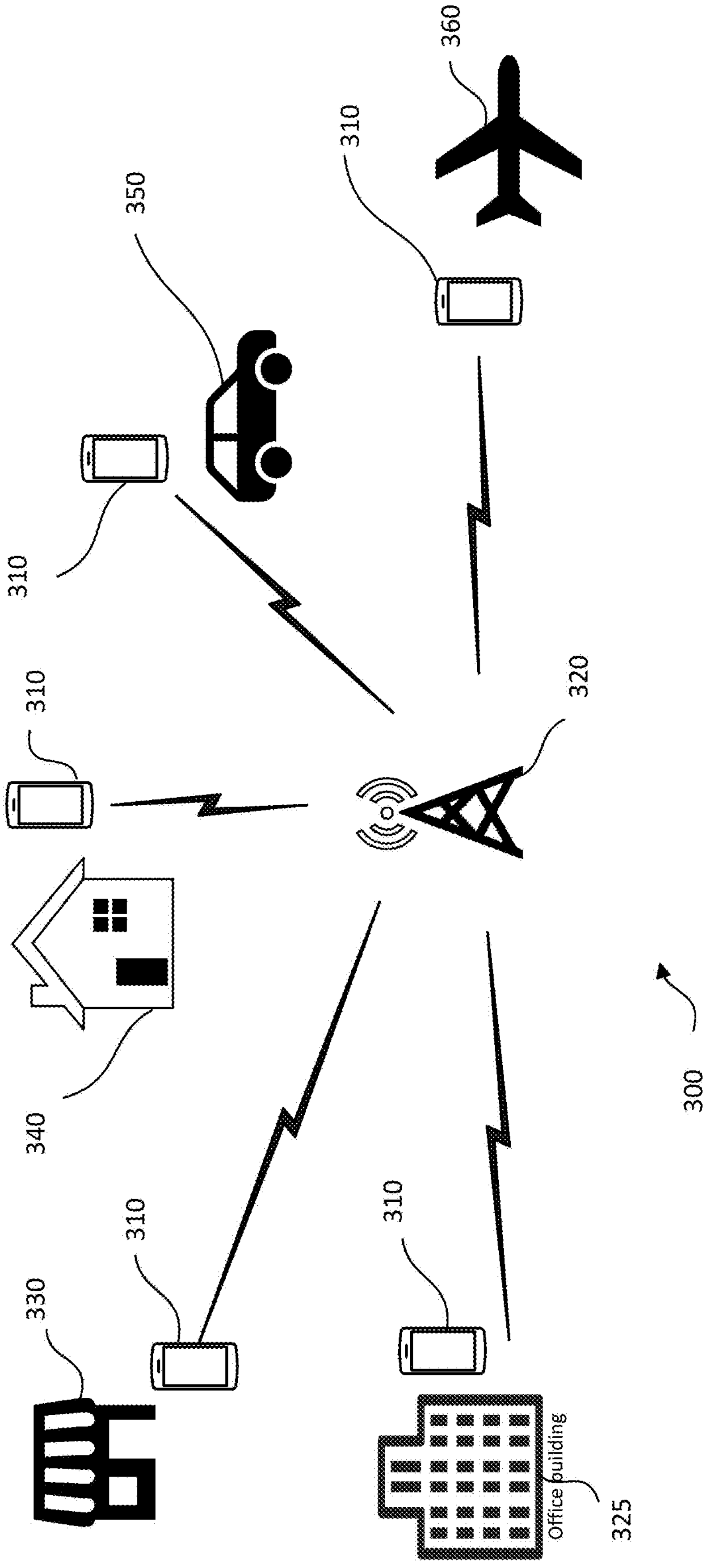
FIG. 3 depicts locations of a wireless user devices in a wireless network, in accordance with another example.

FIGS. 1, 2 and 3 depict wireless network environments 100, 200 and 300 illustrating an access nodes 120, 220 and 320, and wireless user devices 110, 210 and 310 at different locations. The wireless user devices 110, 210 and 310 may be a cell phone, mobile phone, wireless phone, as well as other types of devices or systems that are capable of radio frequency communication. Wireless user devices 110, 210 and 310 are capable of attaching to access nodes 120, 220 and 320 via signals. Access nodes 120, 220 and 320 may be operated by an MNO. While the wireless environments are depicted with a single wireless user devices 110, 210 and 310 and single access nodes 120, 220 and 320 it may comprise multiple other wireless user devices and access nodes.

Access node 120 may be for a wireless network, such as a cellular network, and can include a core network and a radio access network (RAN) serving multiple wireless user devices 110, 210 and 310 in a geographical area covered by a radio frequency transmission provided by the access network. As technology has evolved, different carriers (MNOs) within the cellular network may utilize different types of radio access technologies (RATs) and satellite networks. RATs can include fifth generation (5G) RATs (new radio (NR)) and 6G. Further, different types of access nodes may be implemented within the access network for deployment for the various RATs. A next generation NodeB (gNB) may be utilized for 5G RATs. Deployment of the evolving RATs in a network provides numerous benefits. For example, newer RATs, such as 5G RATs, may provide additional resources to subscribers, faster communications speeds, and other advantages.

In FIG. 1, a wireless user device 110 only requests to attach to access node 120 from home location 140 over time. Wireless user device 110 sends a wireless user device identifier, location area code (LAC) and Cell ID to access node 120 to be verified with an MNO. The LAC and Cell ID are associated with home location 140.

The wireless user device identifier may be a mobile identification number (MIN) or mobile subscription identification number (MSIN) referring to the 10-digit unique number that an MNO uses to identify the wireless user device.

A Cell ID is the identifier of a cell in the physical layer of the radio network, which is used for separation of different transmitters in a LAC. A Cell ID is a generally unique number used to identify each base transceiver station (BTS) or sector of a BTS within a location area code (LAC).

The LAC is a 16-bit number that forms part of the local area identifier (LAI) which includes the Mobile Country Code (MCC), the Mobile Network Code (MNC) and the Local area code. A cellular network is divided into several areas and each location area consists of 1 to 65534 radio transmission cells. Each location area is uniquely identified by a LAC. The LAC is used as a unique reference to determine the location of a wireless user device. The LAC is the unique number given to each location area within the network on the core and radio access network.

Using the wireless user device identifier, Cell ID and LAC, the MNO verifies wireless user device 110 and grants wireless user device 110 access to the network via access node 120. The Cell ID and LAC for location 140 are used to build a location profile for wireless user device 110.

The location profile for the wireless user device identifier records the Cell ID and LAC in a database table for all the locations where the user has requested to and/or attached to an access node. Each request and/or attachment to an access node can be counted. Database table includes wireless user device identifier, Cell ID, LAC, and incremental counter indicating how many times the wireless user device has attempted to and/or accessed the network (e.g., how many times a Cell ID has been used for the wireless user device) for each location. If the location of the wireless user device is changed, a location update is requested, and the location will then be updated using the Cell ID and LAC of the current location of the wireless user device. In one example, the Cell ID and LAC are configured in the core side of MNO such that location information is stable overtime.

With reference to FIG. 1, wireless user device 110 requests and/or attaches to an access node 120 from a single home location 140 over time. Their location profile for wireless user device 110 has the one (Cell ID/LAC) with a high count (number of times requested and/or attached at a location).

With reference to FIG. 2, wireless user device 210, requests and/or attaches to an access node 220 from two locations, a work location 230 and a home location 240 over time. The location profile for wireless user device 210 has two (Cell IDs/LACs) with a medium count (number of times requested and/or attached at a location).

With reference next to FIG. 3, wireless user device 310 requests and/or attaches to an access node 320 from many locations including a work location 325, retail location 330, vehicle location 340 and travel location 350 over time. The location profile for wireless user device 310 has many Cell ID/LACs with low counts for each location.

Below is an exemplary location profile database table 1 for exemplary wireless user devices 110, 210 and 310 of FIGS. 1, 2 and 3.

TABLE 1

| wireless user device Identifier | Request Type | Location LAC/Cell ID, Count |
|---|---|---|
| wireless user device 110 | Attach | {1111234, 20} |
| wireless user device 210 | Attach | {(1111234, 10), (2221234, 10)} |
| wireless user device 310 | Attach | {(1111234, 1), (22225678, 1), (3333678, 1) (44445678, 1) (55555678, 1)} . . . |

Figure 4:
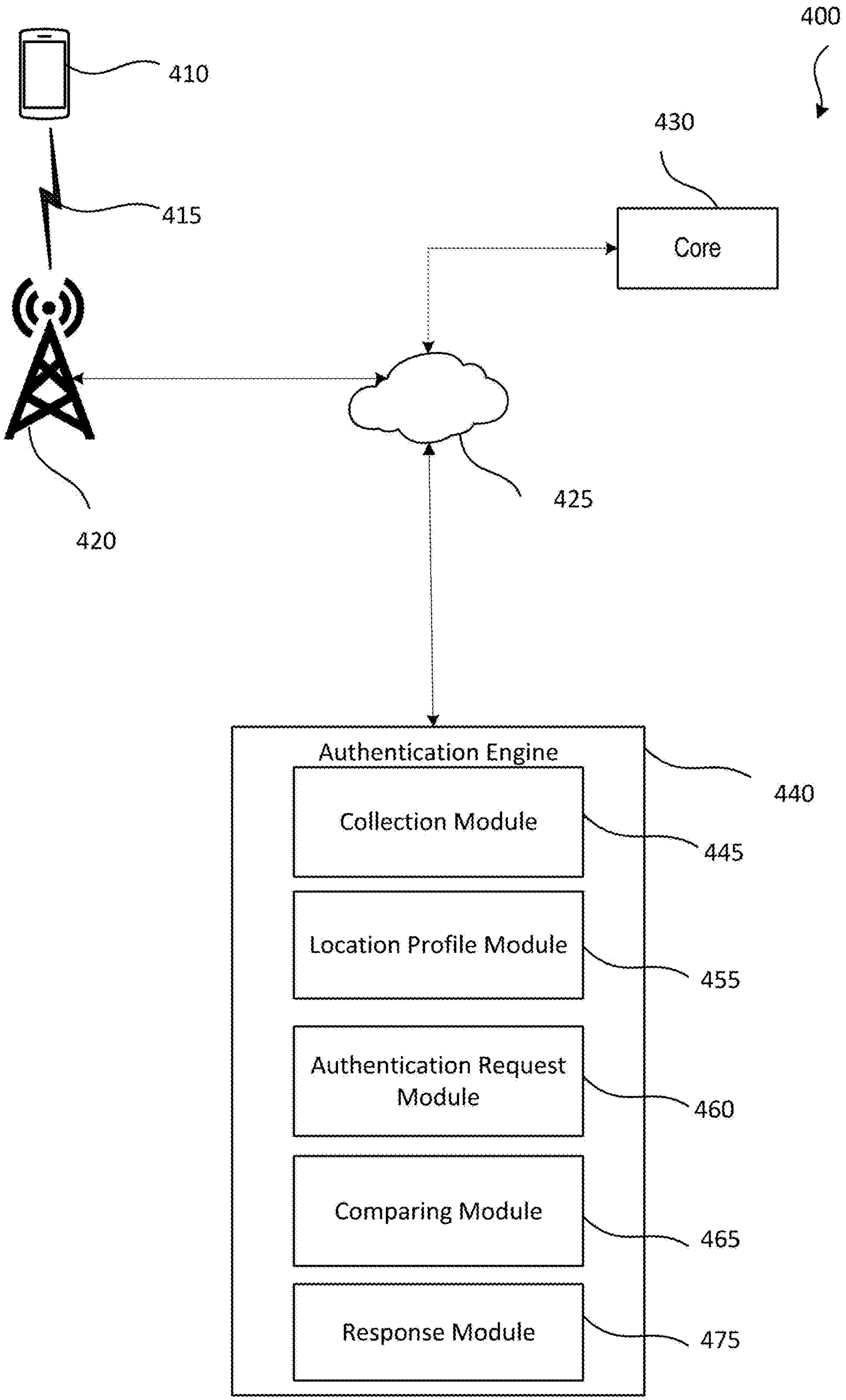
FIG. 4 depicts a system and an authentication engine, in accordance with the disclosed examples.

FIG. 4 illustrates system 400 for secure authentication in a radio access network. For purposes of illustration and explanation, the system 400 is illustrated as a radio access network however, in practical implementations the system 400 may correspond to any RAT or combinations of RATs, including but not limited to 3G RATs such as GSM, UMTS, CDMA, etc.; 4G RAs such as WiMAX, LTE, etc.; 5G RATs such as NR, 6G; and further extensions or updated implementations of the same.

As illustrated, system 400 comprises a network 425, an access node 420, a core 430, which provides service in a coverage area, and an authentication engine 440. For purposes of illustration and ease of explanation, only one access node 420 and one wireless user device 410 are shown in the system 400; however, as noted above with regard to FIG. 1, additional access nodes 420 and/or additional wireless user devices 410 may be present in the system 400.

In the illustration of FIG. 4, the access node 420 is connected to the network 425 via an NR path (including the 5G core 430); however, in practical implementations the access node 420 may be connected to network 425 via multiple paths (e.g., using multiple RATs). The access node 420 may communicate with the core 430 via one or more communication links, each of which may be a direct link. However, it will be appreciated that network 425 may be any type of network facilitating communication among access node 420, core 430, authentication engine 440, and wireless user device 410.

The access node 420 may be any network node configured to provide communications between the connected wireless devices. As examples of a standard access node, the access node 420 may be a gNodeB in 5G networks, an eNodeB in 4G/LTE networks, or the like, including combinations thereof. Access node 420 and core 430 may also provide data to authentication engine 440.

An authentication engine 440 is in communication with the access node 420 and/or the core 430. Authentication engine 440 may be configured to approve, deny, or request additional authentication in response to requests for user account authentication.

The authentication engine 440 can comprise one or more electronic processors and associated circuitry to execute or direct the execution of computer-readable instructions such as those described herein. In so doing, the authentication engine 440 can retrieve and execute software from storage, which can include a disk drive, a flash drive, memory circuitry, or some other memory device, and which may be local or remotely accessible. The software may comprise computer programs, firmware, or some other form of machine-readable instructions, and may include an operating system, utilities, drivers, network interfaces, applications, or some other type of software, including combinations thereof. Moreover, the authentication engine 440 can receive instructions and other input at a user interface.

As illustrated, the authentication engine 440 utilizes a modular controller, a memory, wireless communication circuitry, and a bus through which the various elements of the authentication engine 440 may communicate with access node 420 and core 430. The modular controller is one example of an electronic processor, and may include sub-modules or units, each of which may be implemented via dedicated hardware (e.g., circuitry), software modules which are loaded from the memory and processed by the controller, firmware, and the like, or combinations thereof.

The modules include a collection module 445, location profile module 455, an authentication request module 460, comparing module 465, and response module 475. Some or all of the sub-modules or units may physically reside within the controller or may instead reside within the memory and/or may be provided as separate units, in any combination. The various sub-modules or units may include or implement logic circuits, thereby performing operations such as setting parameters, monitoring parameters, comparing parameters, and generating instructions.

While FIG. 4 illustrates the collection module 445, location profile module 455, authentication request module 460, comparing module 465, and response module 475 as being separate modules, in practical implementations some of the modules may be combined with one another and/or may share components. The collection module 445, location profile module 455, authentication request module 460, comparing module 465, and response module 475 may be configured to perform various operations to implement methods in accordance with the present disclosure. While one example of operations performed by the modules is described here, in practical implementations at least some of the operations described as being performed by one module may instead be performed by another module, including a module not explicitly named here.

The collection module 445 may be configured to collect location data from a wireless user device over time. A wireless user device requests to attach to an access node from various locations. A wireless user device identifier, LAC, and Cell ID are sent from an access node to the core to verify a wireless user device with the MNO. The LAC and Cell ID are associated with the location of the wireless user device. In one example, a Cell ID method is used to provide location services for wireless user devices in second-generation mobile communication networks. Mobile networks identify the approximate position of a wireless user device (mobile device) by knowing which cell site the device is using at a given time. Using the wireless user device identifier, Cell ID and LAC, the MNO verifies wireless user device and grants wireless user device access to the network via access node. In one example, authentication engine 440 makes an API request to back-end core 430 to retrieve the Cell ID and LAC for the wireless user device location(s) and record the Cell ID and LAC in the location profile for the wireless user device thus adding it to the location database table.

The location profile module 455 may be configured to record the location data from a wireless user device over time. The Cell ID and LAC for locations are used to build a location profile for a wireless user device. The location profile for the wireless user device identifier records the Cell ID and LAC in a database table for all the locations where the user has requested to and/or attached to an access node. Each request and/or attachment to an access node can be counted. A database table includes wireless user device identifier, Cell ID, LAC, and incremental counter per location. If the location of the wireless user device is changed, a location update is requested, and the location will then be updated using the Cell ID and LAC of the current location of the wireless user device.

Authentication request module 460 may be configured to receive a request for user account authentication. The authentication request may originate from the wireless user device or other device. The authentication request has an associated location. In one example, the location of the authentication request has an associated Cell ID/LAC to identify the location of where the request originated. In an example, user account authentication requests may be for critical account services such as SIM swapping, user account password reset, authentication to mobile account services such as purchasing goods or services or paying an invoice. The user account authentication request may originate from the wireless user device being authenticated or may originate from a different device and/or application.

User account authentication may be made by the wireless user device or other device for transactions prone to cellular fraud. For example, authentication may be required for sensitive transactions such as SIM swapping, porting a phone number to a different mobile device (cloning) and subscriber fraud such as password changes and purchasing fraud. Secure authentication by authentication engine can be used for sensitive services like SIM swapping, password reset or authentication to their wireless billing accounts.

For example, if a SIM card is being activated on a different mobile phone, an authentication request is sent to authentication engine 440. In some instances, the owner of a SIM card in one wireless user device wants to use the SIM card in a different wireless user device. For example, the owner may have purchased a new and/or upgraded mobile device but wants to continue using the same SIM card. However, in some examples, a SIM card has been physically stolen from a wireless user device and is trying to be used with an unauthorized mobile device. The authentication request assists an MNO from differentiating between a legitimate SIM swap and an unauthorized SIM swap.

In another example, the owner of a wireless user device may have purchased a new and/or upgraded mobile device but wants to continue using the same phone number for the new device. However, in cloning fraud, a wireless user device may have been physically stolen and using personal data from the wireless user device, the phone number is trying to be ported an unauthorized mobile device. The authentication request helps an MNO differentiate between a legitimate request to move a phone number to a new device and an unauthorized move.

In another example, the owner of a wireless user device may want to change the subscriber password and/or make purchases or upgrades to the subscriber account. For example, an owner may wish to purchase accessories or additional services for the wireless user device and/or subscriber account. However, in subscriber fraud, an unauthorized password change or purchases may be attempted for a subscriber account. Often, subscriber fraud occurs when a scammer signs up for cellular service with fraudulently obtained customer information or false identification. The authentication request an MNO differentiate between a legitimate request to change a password or make a purchases and unauthorized password changes and purchases on the subscriber account.

Comparing module 465 may be configured with various logic circuits or elements in order to various logic operations, including but not limited to, operations of comparing the location of the wireless user device associated with the request for user account authentication with the location profile for the wireless user device to determine if the location associated with the authentication request satisfies a threshold. The threshold for a wireless user device based on location profile medium may be high, medium, and low. For example, for FIG. 1, the threshold to approve an authentication request may be high and only will approve authentication requests originating from the single home location 140. If the authentication request is from a location other than the home location 140, authentication engine 440 may require additional authentication.

For example, in FIG. 2, the threshold to approve an authentication may be medium and may be met if the authentication request originates from any one of locations 230 and 240. If the authentication request is from a location other than locations 230 and 240, authentication engine 440 may require additional authentication.

For example, in FIG. 3, the threshold to approve an authentication may be low as the wireless user device has authenticated from locations all over the country. A low threshold may approve authentication requests from many different locations including locations 325, 330, 340, 350 and other locations. The other locations may include general geographic locations (cities, regions, states) where the wireless user device has been located previously or may approve authentication requests originating from any location in the network. In one example, if the authentication request is from a location other than general geographic locations where the wireless user device has previously been located, authentication engine 440 may require additional authentication.

The response module 475 may cause a response to an authentication request to be generated. If the location associated with the authentication request satisfies a threshold, response module 475 may generate an approval of the request for user account authentication.

If the location associated with the authentication request does not satisfy a threshold, response module 475 may generate one or more additional authentication requests and/or a denial of the request for user account authentication.

Additional authentication may be second factor authentication requiring a user to perform another factor of authentication such as entering an email or SMS pin immediately after entering their password. In another example, additional authentication may be multifactor authentication. Multifactor authentication to securing data and applications where a system requires a user to present a combination of two or more credentials to verify a user's identity for login such as password, passphrase, or personal identification number (PIN) and a physical authenticator such as a token, smart card or biometric like a fingerprint.

Figure 5:
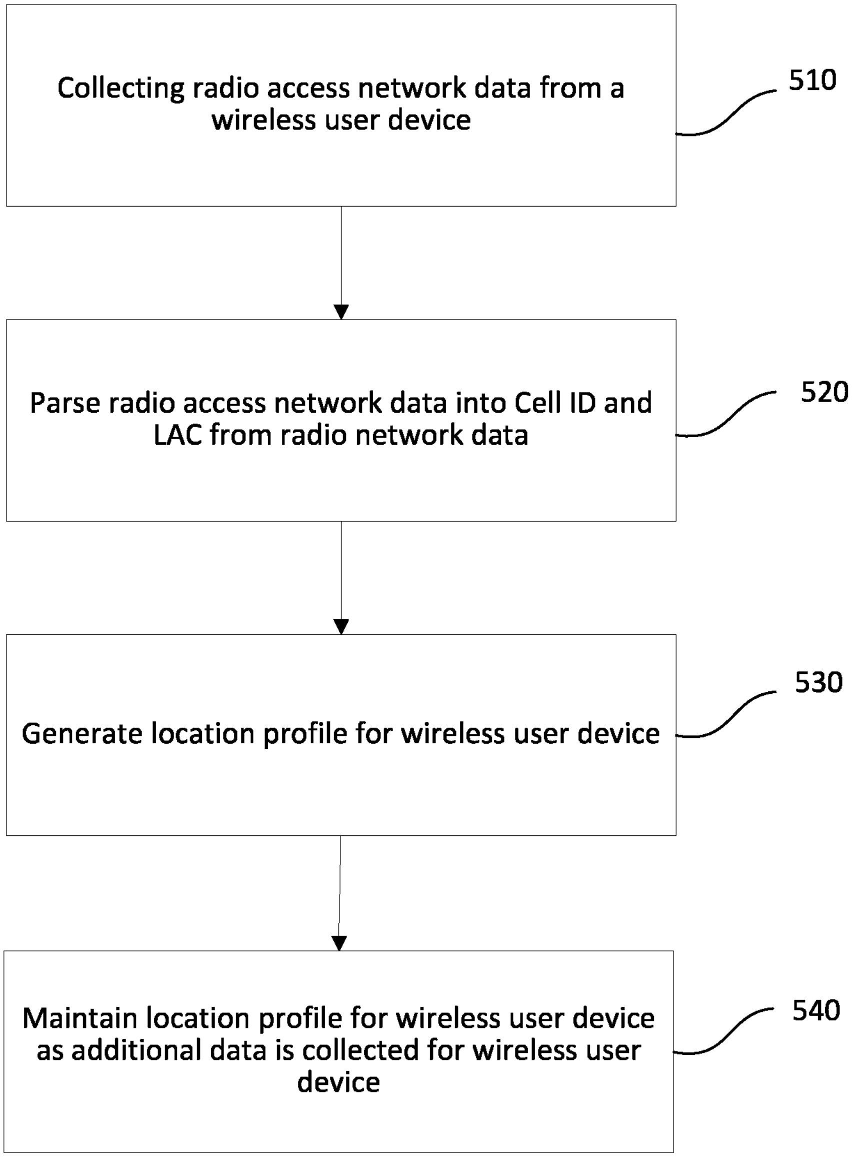
FIG. 5 depicts a flowchart illustrating an exemplary method for creating and maintaining a location profile for a wireless user device, in accordance with the disclosed examples.

FIG. 5 illustrates an exemplary process flow for generating a protection area for a wireless access node. The operations of FIG. 5 will be described as being performed by the authentication engine 440 for purposes of explanation. In other implementations, the operations may be performed by or under the control of a processor of a wireless access node, 5 g core or processed in a cloud environment.

The process flow begins at operation 510, radio access network data is collected from a wireless user device. Radio access network data may be collected by a core network of a RAN serving multiple wireless user devices. Different carriers (MNOs) within the cellular network utilize different types of radio access technologies (RATs). The RAN data may include location data from a wireless user device over time. A wireless user device requests to attach to an access node from various locations. The location data may include a device identifier, LAC, and Cell ID.

At operation 520, parse radio access network data into Cell ID and LAC from radio network data. A Cell ID is a generally unique number used to identify each base transceiver station (BTS) or sector of a BTS within a location area code (LAC). The LAC is a 16-bit number that forms part of the local area identifier (LAI) which includes the Mobile Country Code (MCC), the Mobile Network Code (MNC) and the Local area code.

At operation 530, generate location profile for wireless user device. The location profile for the wireless user device identifier records the Cell ID and LAC in a database table for all the locations where the user has requested to and/or attached to an access node.

At operation 540, maintain location profile for wireless user device as additional data is collected for wireless user device. Each request and/or attachment of a wireless user device to an access node can be counted. Database table includes wireless user device identifier, Cell ID, LAC, and incremental counter indicating how many times the wireless user device has attempted and/accessed the network (e.g., how many times a Cell ID/LAC has been used for the wireless user device) for each location.

Figure 6:
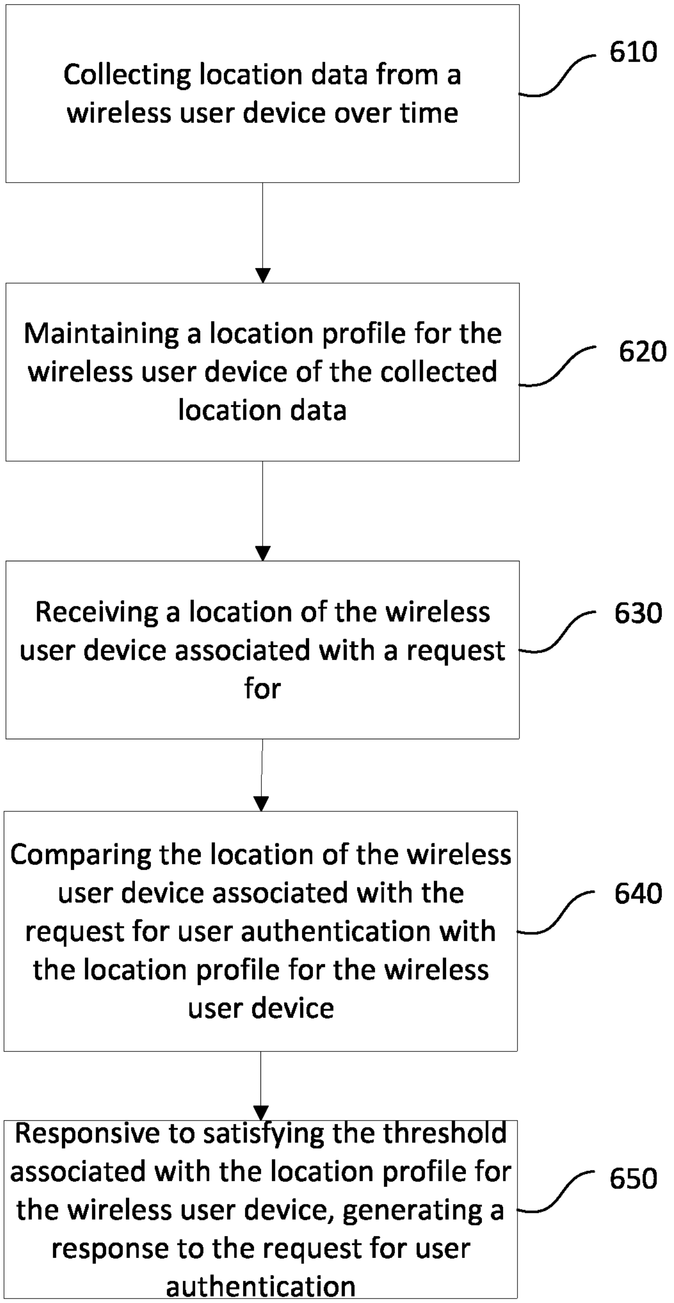
FIG. 6 depicts a flowchart illustrating an exemplary method for generating a response to an authentication request from a wireless user device, in accordance with the disclosed examples.

FIG. 6 illustrates an exemplary process flow for approving and/or denying an authentication request. The operations of FIG. 6 will be described as being performed by the authentication engine 440 for purposes of explanation. In other implementations, the operations may be performed by or under the control of a processor of a wireless access node, core or processed in a cloud environment.

At operation 610, collect location data from a wireless user device over time.

At operation 620, maintain a location profile of the Cell ID/LAC locations for the wireless user device of the collected location data.

At operation 630, receive a location of the wireless user device associated with a request for user account authentication. The authentication request may originate from the wireless user device or other device. The authentication request has a location associated with it. In one example, the location of the authentication request has an associated Cell ID/LAC to identify the location of where the request originated.

At operation 640, compare the location of the wireless user device associated with the request for user account authentication with the location profile for the wireless user device. The location of the wireless user device associated with the request for user account authentication with the location profile for the wireless user device to determine if the location associated with the authentication request satisfies a threshold. The threshold for a wireless user device based on location profile may be high, medium, or low.

At operation 650, responsive to satisfying the threshold associated with the location profile for the wireless user device, generate a response to the request for user authentication. Depending on the threshold, the response may be to approve the authentication request, deny the authentication request or request additional measures of authentication.

The operations of FIGS. 5 and 6 need not necessarily be performed one after another in immediate sequence. While the above descriptions illustrate various aspects of the present disclosure, the present disclosure is not so limited. The methods and operations described above may be performed in an iterative matter. These additional iterations may also be reverted in a manner similar to that described above.

The exemplary systems and methods described herein may be performed under the control of a processing system executing computer-readable codes embodied on a computer-readable recording medium or communication signals transmitted through a transitory medium. The computer-readable recording medium may be any data storage device that can store data readable by a processing system, and may include both volatile and nonvolatile media, removable and non-removable media, and media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid-state storage devices. The computer-readable recording medium may also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention and are intended to be illustrative and not restrictive. Many examples and applications other than the examples provided would be apparent to those skilled in the art upon reading the above description. The scope should be determined, not with reference to the above description, but instead with reference to the appended claims, along with the full scope of equivalents to which such claims are entitled. It is anticipated and intended that future developments will occur in the technologies discussed herein, and that the disclosed systems and methods will be incorporated into future examples. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary is made herein. In particular, the use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A system comprising:

at least one computing device, including at least one processor configured to:

receive a location of a wireless user device associated with a request for user account authentication for a mobile network operator (MNO);

populate a location profile for the wireless user device with Cell ID and location area code (LAC) for each of one or more locations of the wireless user device over time;

retrieve from a back-end core of the MNO the location profile with the Cell ID and LAC for each of one or more locations of the wireless user device over time;

responsive to retrieving from location profile with the Cell ID and LAC for each of the one or more locations of the wireless user device over time, compare the location of the wireless user device associated with the request for user account authentication with the location profile including the Cell ID and LAC for each of the one or more locations of the wireless user device over time to determine if the location of the wireless user device associated with the request for user account authentication satisfies a threshold associated with the location profile; and responsive to satisfying the threshold associated with the location profile for the wireless user device, generate a response to the request for user account authentication.

2. The system of claim 1, wherein the locations of the wireless user device over time are accessed from radio access network (RAN) data.

3. The system of claim 1, wherein the response to the request for user account authentication is one of approve, deny, or request additional authentication.

4. The system of claim 1, wherein maintaining the location profile of the wireless user device is maintained by a core network of the MNO.

5. The system of claim 1, wherein the request for user account authentication is for one of subscriber identification module (SIM) swap, user account password reset or a user account wireless billing account transaction.

6. The system of claim 1, wherein the request for user account authentication originates at the wireless user device.

7. A method comprising:

receiving a location of a wireless user device associated with a request for user account authentication for a mobile network operator (MNO);

populating a location profile for the wireless user device with Cell ID and location area code (LAC) for each of one or more locations of the wireless user device over time;

retrieving from a back-end core of the MNO the location profile with the Cell ID and LAC for each of one or more locations of the wireless user device over time;

responsive to retrieving from location profile with the Cell ID and LAC for each of the one or more locations of the wireless user device over time, comparing the location of the wireless user device associated with the request for user account authentication with the location profile including the Cell ID and LAC for locations of the wireless user device over time to determine if the location associated with the wireless user device for the request for user account authentication satisfies a threshold associated with the location profile; and responsive to satisfying the threshold associated with the location profile for the wireless user device, generating a response to the request for user account authentication.

8. The method of claim 7, further comprising:

collecting radio access network data from the wireless user device.

9. The method of claim 8, further comprising:

parsing the radio access network data into Cell ID and LAC.

10. The method of claim 9, further comprising:

populating the location profile for the wireless user device with the Cell ID and the LAC for each location for the wireless user device over time.

11. The method of claim 10, further comprising:

maintaining the location profile for wireless user device collected Cell ID and LAC for the wireless user device.

12. A non-transitory computer-readable medium storing instructions that when executed by a processor cause the processor to perform operations comprising:

receiving a location of a wireless user device associated with a request for user account authentication for a mobile network operator (MNO);

populating a location profile for the wireless user device with Cell ID and location area code (LAC) for each of one or more locations of the wireless user device over time;

retrieving from a back-end core of the MNO the location profile with the Cell ID and LAC for each of one or more locations of the wireless user device over time;

responsive to retrieving from location profile with the Cell ID and LAC for each of the one or more locations of the wireless user device over time, comparing the location of the wireless user device associated with the request for user account authentication with the location profile including the Cell ID and LAC for locations of the wireless user device over time to determine if the location of the wireless user device associated with the request for user account authentication satisfies a threshold associated with the location profile; and responsive to satisfying the threshold associated with the location profile for the wireless user device, generating a response to the request for user account authentication.

13. The non-transitory computer-readable medium of claim 12, wherein the locations of the wireless user device over time are accessed from radio access network (RAN) data.

14. The non-transitory computer-readable medium of claim 13, wherein the radio access network data comprises Cell ID and location area code (LAC) for each location of the wireless user device.

15. The non-transitory computer-readable medium of claim 12, wherein the response to the request for user account authentication is one of approve, deny, or request additional authentication.

16. The non-transitory computer-readable medium of claim 12, wherein a core network of the MNO maintains the location profile of the wireless user device.

17. The non-transitory computer-readable medium of claim 12, wherein the request for user account authentication is for one of subscriber identification module (SIM) swap, user account password reset or a user account wireless billing account transaction.

18. The non-transitory computer-readable medium of claim 12, wherein the request for user account authentication originates at the wireless user device.

* * * * *